US012461838B2

(12) United States Patent
Bhat et al.

(10) Patent No.: US 12,461,838 B2
(45) Date of Patent: Nov. 4, 2025

(54) CONFIGURABLE SYSTEM TRAY APPLICATION

(71) Applicant: ServiceNow, Inc., Santa Clara, CA (US)

(72) Inventors: Ganesh Parameshwar Bhat, Bangalore (IN); Venkata Phani Kumar Gudladona, Bangalore (IN); Harsha Vijayakumar, Milpitas, CA (US); Nitin Laxmanbhai Gupta, Bangalore (IN); Cary Evans, Encinitas, CA (US)

(73) Assignee: ServiceNow, Inc., Santa Clara, CA (US)

( * ) Notice: Subject to any disclaimer, the term of this patent is extended or adjusted under 35 U.S.C. 154(b) by 223 days.

(21) Appl. No.: 18/093,672

(22) Filed: Jan. 5, 2023

(65) Prior Publication Data

US 2024/0232033 A1 Jul. 11, 2024

(51) Int. Cl.

| | |
|---|---|
| ***G06F 11/30*** | (2006.01) |
| ***G06F 3/0481*** | (2022.01) |
| ***G06F 3/0484*** | (2022.01) |
| ***G06F 11/32*** | (2006.01) |
| ***G06F 11/34*** | (2006.01) |

(52) U.S. Cl.

CPC ........ *G06F 11/3051* (2013.01); *G06F 3/0484* (2013.01); *G06F 11/3058* (2013.01); *G06F 11/328* (2013.01)

(58) Field of Classification Search

CPC ............................ G06F 9/452; H04L 67/1029

See application file for complete search history.

(56) References Cited

U.S. PATENT DOCUMENTS

| | | | | |
|---|---|---|---|---|
| 2008/0225718 | A1* | 9/2008 | Raja | H04L 67/1001 370/252 |
| 2009/0119678 | A1* | 5/2009 | Shih | H04L 51/00 719/313 |
| 2012/0023421 | A1* | 1/2012 | Demant | G06F 9/452 715/765 |
| 2013/0129071 | A1* | 5/2013 | Teitelman | H04M 3/42221 379/265.06 |
| 2014/0164474 | A1* | 6/2014 | Issa | H04L 67/51 709/202 |
| 2018/0150477 | A1* | 5/2018 | Jewell | G06F 16/172 |

* cited by examiner

*Primary Examiner* — Getente A Yimer

(74) *Attorney, Agent, or Firm* — McDonnell Boehnen Hulbert & Berghoff LLP

(57) ABSTRACT

An executable configuration is provided to an agent executing on a client device, wherein the agent is configured to execute the executable configuration and to collect metrics associated with the client device. User interface metadata is provided for an operating system tray application executing on the client device, wherein the user interface metadata indicates a plurality of different component functions. The plurality of different component functions includes a first component function to obtain, from the agent, at least a portion of the collected metrics, and to provide a first behavior on the operating system tray application. The plurality of different component functions also includes a second component function to obtain service data from a cloud service, and to provide a second behavior on the operating system tray application.

19 Claims, 9 Drawing Sheets

101 Client with System Tray Application

151 Network

111 Cloud Server

121 Database

CONFIGURABLE SYSTEM TRAY APPLICATION

BACKGROUND OF THE INVENTION

Clients with network capabilities can be configured to access functionality performed and data located both locally and remotely. For example, local functionality includes processing performed on the local client and remote functionality can include functionality performed by a cloud service. Similarly, accessed data can be stored and retrieved locally and/or provided by a cloud service to the client. Combinations of remote and local processing and data can be appropriate as well. One common approach for accessing remote cloud features is via a network application such as a web browser.

BRIEF DESCRIPTION OF THE DRAWINGS

Various embodiments of the invention are disclosed in the following detailed description and the accompanying drawings.

DETAILED DESCRIPTION

Figure 1:
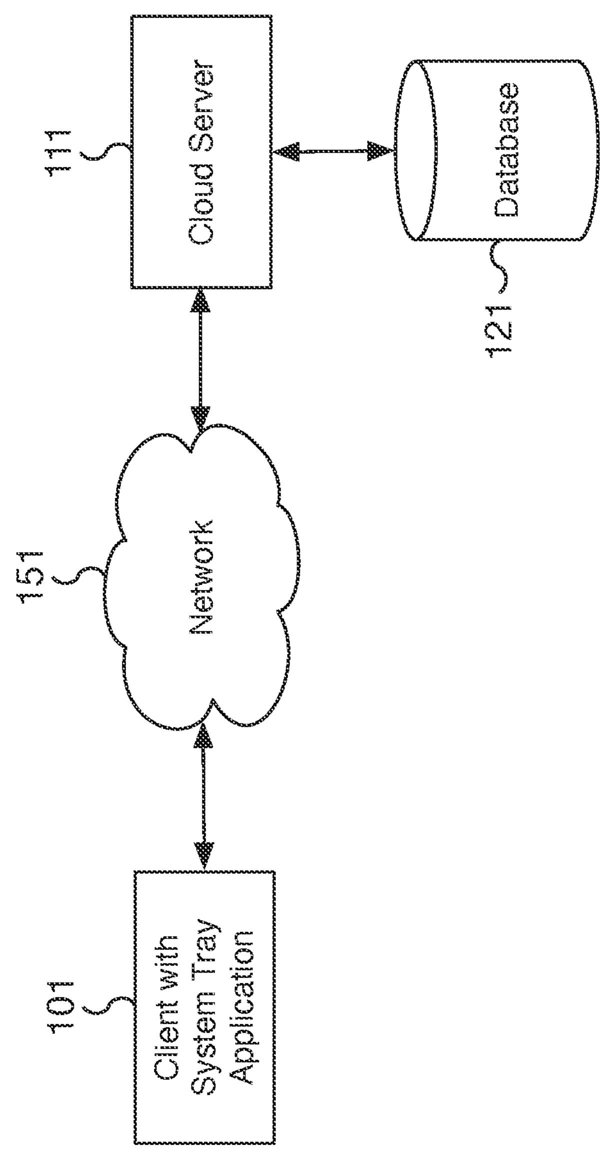
FIG. 1 is a block diagram illustrating an embodiment of a platform for a configurable system tray application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term ‘processor’ refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A platform for a cloud-based configurable system tray application is disclosed. The disclosed system tray application, which can be configured and managed via a cloud service, allows a user to access functionality and data local to the client computing system as well as functionality and data from remote sources such as cloud services. In various embodiments, the system tray application is an operating system tray application with a configurable user interface. For example, the user interface (UI) and associated functionality can be defined and managed via a cloud service. Thus, when additional functionality is desired, an administrator updates the UI and associated functionality of the system tray application by accessing a cloud service for the system tray application. An updated UI metadata is provided to the client system with the system tray application installed, initiating the update process of the system tray application to support the new features.

In various embodiments, the local client computing system further includes an installed agent such as a monitoring agent capable of executing functionality locally on the client. The installed agent can be managed, configured, and updated via a cloud service to execute programs and/or scripts on the local client. For example, in various embodiments, the agent can be configured to monitor and collect client system metrics such as processor utilization, memory utilization, application performance, and network activity, among other metrics. By communicating with the local agent, the system tray application can access and provide locally computed results, such as monitored and collected client metrics, to the local user of the client system. In some embodiments, the results may be further provided to the cloud service, for example, to help an administrator manage the client system.

In some embodiments, the disclosed system tray application is an always running application and is accessible to the local client user regardless of the current selected, running, and/or in-focus application. For example, the system tray application can be automatically launched and started when the client system boots and continues to run until the client system is shut down. In some embodiments, in the event the system tray application shuts down, the system tray application can be configured to restart automatically. In various embodiments, the system tray application allows a user to access functionality and data more conveniently and efficiently at least in part by providing access to both local and remote features and functionality from an always-running local application. For example, the system tray application can be configured to avoid repeating a tedious and laborious sign-in process often required for accessing cloud services as well as additional network latency required to access local metrics that are stored at a cloud service.

In some embodiments, an executable configuration is provided to an agent executing on a client device, wherein the agent is configured to execute the executable configuration and to collect metrics associated with the client device. For example, an agent running on the local client device, such as a local computer system, downloads from a cloud service a configuration used to determine what executable components should be run locally. The configuration can be managed and updated by an administrator of the cloud service. Once the local agent receives the executable configuration, the agent is automatically configured to run the executable components described by the configuration. In some embodiments, the received executable configuration includes one or more scripts or programs, for example, to implement the executable configuration. For example, the agent can be configured to collect metrics associated with the client device such as processor utilization, memory utilization, application performance, and network activity, among other metrics.

In some embodiments, user interface (UI) metadata is provided for an operating system tray application executing on the client device, wherein the user interface metadata indicates a plurality of different component functions. For example, the operating system tray application accessible to the user is installed on the client device and has an UI configurable and provided via a cloud service. Once configured, for example, by an administrator via the cloud service, the UI of the system tray application is updated by receiving the UI metadata from the cloud service. Since the UI is configurable, the UI can be customized for the user of the local device. For example, the UI can be customized based on user, device, and/or other properties, such as the work group(s) to which the user belongs, permissions granted to the user, access the user has to certain hardware functionality on the local client device, and/or the hardware and/or other capabilities of the local device, etc. Depending on the configuration, different component functions are enabled in the system tray application and made available to the user. In various embodiments, the UI of the system tray application is customized for a user of the client device. For example, the UI can be customized for a particular user, a group or users, the set of groups to which the user belongs, or another user-based property.

In some embodiments, the plurality of different component functions includes a first component function and a second component function. The first component function obtains and/or is configured to obtain, from the agent, at least a portion of the collected metrics and provides (and/or is configured to provide) a first behavior on the operating system tray application. For example, one behavior made available to the user is the ability to access metrics collected by an agent executing on the same client device. The local agent monitors and collects metrics, such as resource utilization metrics, and provides the results to the user via the system tray application. For example, the system tray application includes the functionality and behavior associated with a graphical user interface to access the metrics collected by the agent. In some embodiments, the provided functionality and behavior can include initiating the collection of metrics from the system tray application, such as initiating the running of a network speed test and receiving the test results as performed by the agent.

In some embodiments, the second component function obtains and/or is configured to obtain service data from the cloud service and provides (and/or is configured to provide) a second behavior on the operating system tray application. For example, another behavior made available to the user is the ability to access service data from the cloud service. The accessed data can include a variety of different data and presentation/interaction formats including informational data presented as articles such as corporate policies and rules as well as spreadsheets or other forms of documents and/or media. In some embodiments, the accessed data includes real-time notifications that are pushed from the cloud service to the system tray application. For example, notifications for a specific installed application can be pushed to the system tray application based on application performance metrics collected from the agent.

FIG. 1 is a block diagram illustrating an embodiment of a platform for a configurable system tray application. In the example shown, client 101 is a network client with an operating system tray application. Client 101 accesses one or more services hosted by cloud server 111 via network 151. Network 151 can be a public or private network. In some embodiments, network 151 is a public network such as the Internet. The services offered by cloud server 111 can be a variety of cloud-based services including configuration management database (CMDB) services. For example, the provided CMDB services can be used at least in part for managing digital workflows for enterprise operations. In the example shown, cloud server 111 utilizes database 121.

In some embodiments, client 101 is a network client device for accessing cloud services of cloud server 111. The accessed cloud services can include services for managing and/or administrating an operating system tray application and/or local agent installed on clients such as client 101. In the example shown, client 101 is configured with an operating system tray application that allows the local user to access cloud server 111 from directly within the system tray application instead of via a traditional web browser. For example, in various scenarios, CMDB data can be accessed, incident tickets can be created and updated, and notifications can be received all from within the system tray application.

In various embodiments, the user of client 101 is also able to access the results of executable functionality performed by a local agent installed on client 101. For example, a local agent installed on client 101 can execute functionality local to client 101 and provide the computed results, such as collected client device metrics, to client 101 and/or cloud server 111. In some embodiments, the system tray application allows the user to access the data directly from the local agent bypassing a round-trip required to cloud server 111 if the request for the same data was made via cloud server 111. Examples of executed functionality include collecting metrics associated with client 101 such as processor activity, processor performance, memory usage, storage usage, activity time, process properties, temperature, graphics processor performance, and/or network activity. The process properties can include a list of current running processes and/or the memory usage of one or more processes of client 101.

In various embodiments, the system tray application of client 101 is configurable and includes a configurable user interface. For example, the user interface and corresponding functionality and behavior can be configured by receiving user interface metadata from cloud server 111. The UI metadata can specify different component functions and behavior with associated user interface views. For example, a view type of a described user interface view can correspond to a configuration for a chatbot, an interactive form, a list, a document, a spreadsheet, a video, an image, an audio file, a popout window, or a tabbed window.

In some embodiments, the local agent of client 101 is configured with an executable configuration. The executable configuration allows the local agent to execute local functionality on client 101. For example, scripts, programs, and/or other executable components can be configured and provided to the local agent of client 101 from a cloud server for execution by the local agent. In some embodiments, the local agent and associated system tray application run in different process spaces and can be configured with different access permissions. For example, the local agent can be configured with more specialized permissions for accessing hardware devices and/or other more secure resources of client 101. In some embodiments, a first set of access permissions is granted to the operating system tray application that is different from a second set of access permissions granted to the local agent executing on client 101. The first set of access permissions assigned to the system tray application can allow the system tray application to access cloud services while the second set of access permissions assigned to the local agent can allow the local agent to access privileged resources of client 101.

In some embodiments, cloud server 111 is a cloud server that offers cloud-based services including the configuration of the system tray application installed on client 101. For example, cloud server 111 can provide user interface (UI) metadata to configure the system tray application of client 101. The provided UI metadata can specify different functionality and behavior, such as different component functions and corresponding behavior that are configured for the user of client 101 to access from within the system tray application. In some embodiments, a first component function can be used to obtain results from a local agent running on client 101 and a second component function can be used to obtain cloud service data from a cloud service such as cloud server 111. In various embodiments, cloud server 111 can also provide an executable configuration to the local agent of client 101. The provided executable configuration can be used to configure the local agent to execute the different executable components such as different executable components to collect metrics associated with client 101.

In some embodiments, database 121 is utilized by cloud server 111 for storing and/or retrieving cloud service data including configuration data for a system tray application and/or local agent installed on clients such as client 101. For example, the user interface metadata for configuring a system tray application can be stored at database 121 along with the executable configuration for configuring a local agent. The stored configuration data can be provided to a client such as client 101 by cloud server 111. In some embodiments, database 121 is implemented using one or more data stores such as one or more distributed data storage or database servers. For example, although shown as a single entity in FIG. 1, database 121 can be implemented as one or more distributed data store or database components connected via network 151 to cloud server 111.

Although single instances of some components have been shown to simplify the diagram of FIG. 1, additional instances of any of the components shown in FIG. 1 may exist. For example, cloud server 111 and database 121 may include one or more servers and/or may share servers. Additionally, client 101 is just one example of a potential client device with a system tray application and many more additional clients can exist and communicate with and/or be managed from cloud server 111. Similarly, database 121 may include one or more database or data store servers. In some embodiments, database 121 may not be directly connected to cloud server 111. For example, database 121 and its components may be replicated and/or distributed across multiple servers and/or components. In some embodiments, components not shown in FIG. 1 may also exist.

Figure 2:
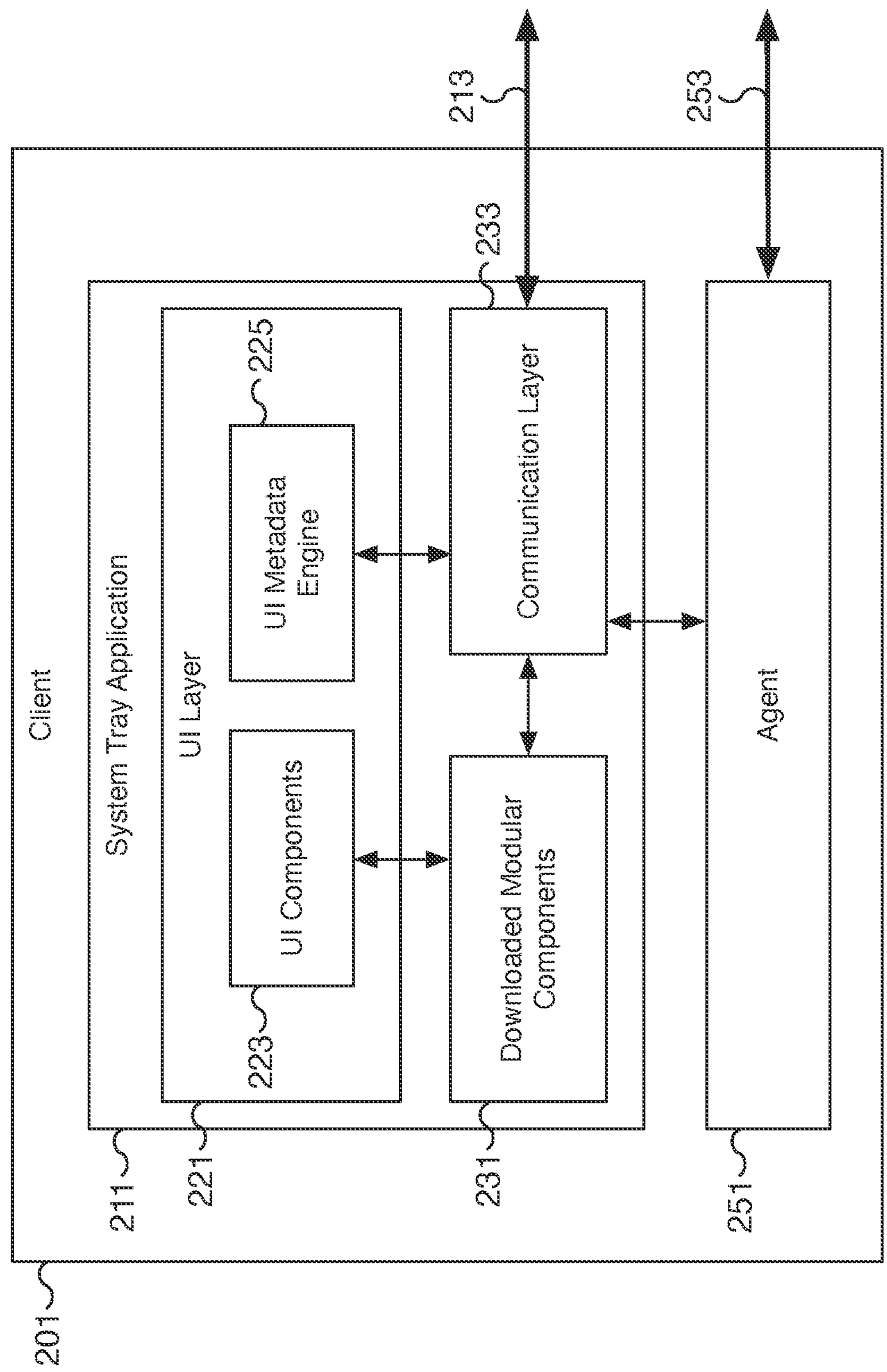
FIG. 2 is a block diagram illustrating an embodiment of a client device with a system tray application.

FIG. 2 is a block diagram illustrating an embodiment of a client device with a system tray application. In the example shown, client 201 is a network client and includes system tray application 211 and agent 251. In various embodiments, system tray application 211 is an operating system tray application and includes user interface (UI) layer 221, downloaded modular components 231, and communication layer 233. UI layer 221 of system tray application 211 includes user interface (UI) components 223 and user interface (UI) metadata engine 225. As shown in the example of FIG. 2, UI components 223 is communicatively connected to downloaded modular components 231 and UI metadata engine 225 is communicatively connected to communication layer 233. Communication layer 233 of system tray application 211 utilizes network connection 213 to communicate with remote services such as one or more cloud services. Agent 251 of client 201 is a local agent running on client 201. Agent 251 of client 201 utilizes network connection 253 to communicate with remote services such as one or more cloud services. In some embodiments, client 201 is client 101 of FIG. 1 and network connections 213 and/or 253 correspond to network connections for accessing cloud server 111 of FIG. 1 via network 151 of FIG. 1.

In some embodiments, system tray application 211 is a configurable application that is accessible from an operating system tray. System tray application 211 can be configured to be already running (either in the foreground, background, or another appropriate focus setting, as appropriate) on client 201 and is easily accessible by the user of client 201. In various embodiments, the user interface (UI) of system tray application 211 is configurable and is implemented by UI layer 221 using at least UI components 223, downloaded modular components 231, and UI metadata engine 225. For example, UI layer 221 processes a UI configuration via UI metadata engine 225 to provide the user interface of system tray application 211 to the local user. In some embodiments, the UI configuration is provided as metadata via a cloud service, for example, by downloading the UI metadata via network connection 213 using communication layer 233. After the UI metadata is received by communication layer 233, the UI metadata is provided to UI metadata engine 225, where the UI metadata can be parsed and used to implement the UI of system tray application 211. For example, the UI metadata can specify different component functions and behavior with associated user interface views. For example, a view type of a described user interface view can correspond to a configuration for a chatbot, an interactive form, a list, a document, a spreadsheet, a video, an image, an audio file, a popout window, or a tabbed window.

In some embodiments, the configurable UI of system tray application 211 relies on UI components 223 as well as downloaded modular components 231. For example, the functionality of system tray application 211 can be expanded by adding additional UI components and functionality to downloaded modular components 231. In some embodiments, installed UI components are included in UI components 223 whereas components that are downloaded, such as provided via network connection 213 and communication layer 233, are stored in downloaded modular components 231. In some embodiments, components from downloaded modular components 231 can include UI and non-UI components and the UI components can be transferred to UI components 223, for example, for improved efficiency.

In some embodiments, the system tray application 211 is configured using one or more different policies and the multi-policy configuration supports (potentially overlapping) functionality configured for different groups. For example, a user may require functionality associated with three different policy groups: human resources, legal, and information technology; and each group provides its own configuration. In this scenario, system tray application 211 can download three different modular configuration components to downloaded modular components 231, each to support and implement the different functionality required for membership to a different group. The configuration components for the human resources group can include functionality related to the human resources department, the legal group can include functionality related to the legal department, and the information technology group can include functionality related to the information technology department. In some embodiments, the different groups can further update their respective modular components as new functionality is added or removed. In various embodiments, the provided modular components can include both UI functionality as well as other non-UI processing logic. For example, a modular component can include the functionality for displaying a chatbot user interface as well as the processing logic for implementing the chatbot functionality. Similarly, a modular component can include the functionality for displaying the user interface of a spreadsheet as well as the processing logic for implementing the spreadsheet functionality.

In some embodiments, agent 251 is a local agent of client 201 that is configured with an executable configuration. For example, an executable configuration can be received via network connection 253 that provides agent 251 with executable functionality to execute on client 201. In some embodiments, the executable configuration specifies one or more scripts, programs, and/or other executable components that can be configured and/or provided to agent 251 from a cloud server for local execution on client 201. Example executable components include executable components for collecting metrics of client 201 including metrics related to processor activity, processor performance, memory usage, storage usage, activity time, process properties, temperature, graphics processor performance, and/or network activity. In various embodiments, the executable configuration allows for new executable components to be downloaded via network connection 253 for execution by agent 251.

In some embodiments, agent 251 is assigned access permissions that can include privileged access permissions for accessing privileged resources including operating system resources and/or kernel resources of client 201. For example, agent 251 can be assigned permissions for accessing properties of one or more network interface devices, processors, memory, and/or other hardware components and/or secured resources of client 201. In some embodiments, the access permissions granted to system tray application 211 are different from the access permissions granted to agent 251.

In some embodiments, system tray application 211 and/or agent 251 include one or more caches or data stores (not shown). For example, an included cache or temporary data store can be used to cache/store results collected by agent 251, such as client metrics collected by monitoring the performance of client 201. The results can be cached by agent 251 and/or by system tray application 211.

Figure 3:
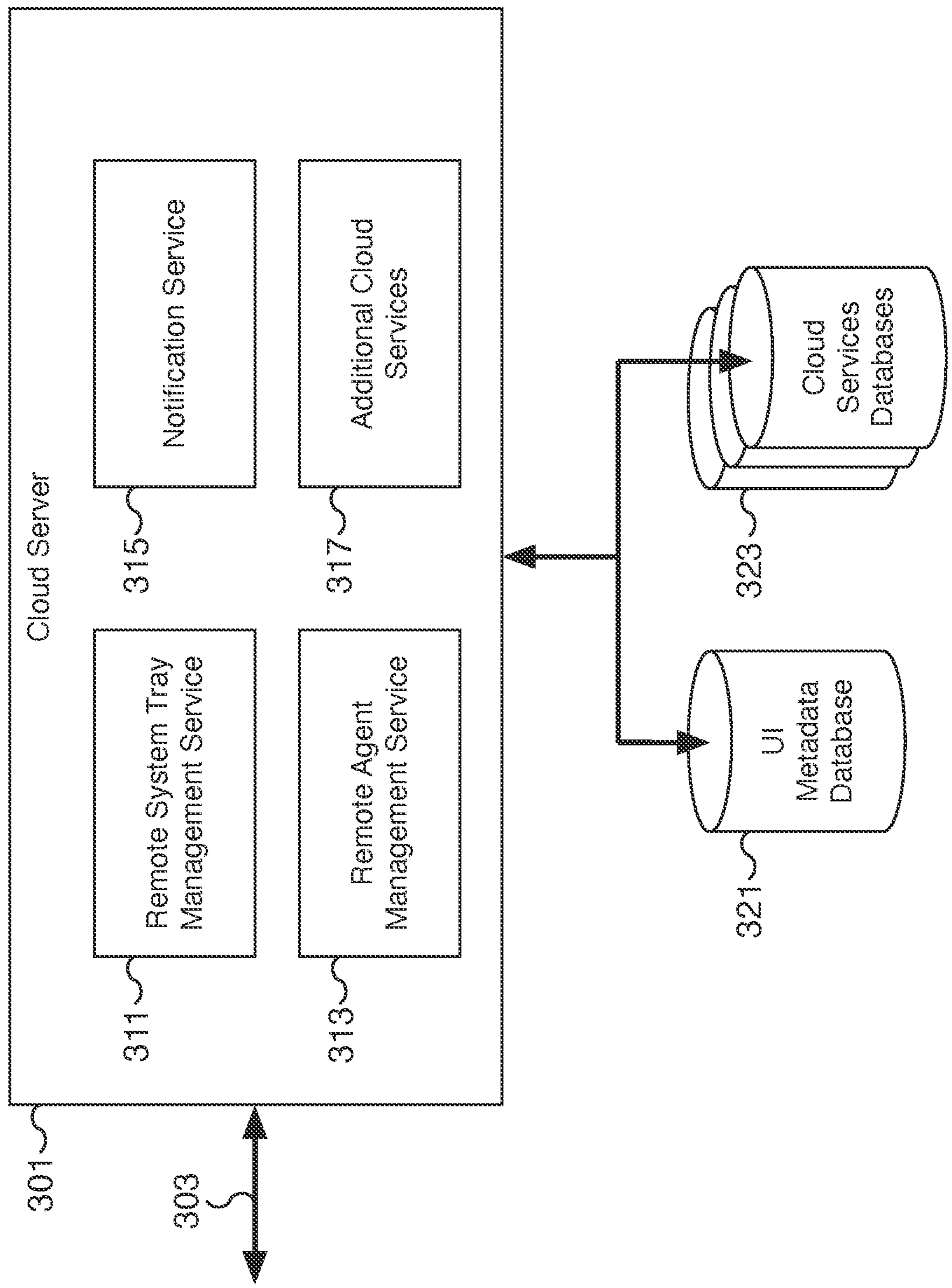
FIG. 3 is a block diagram illustrating an embodiment of a cloud server for supporting a client system tray application.

FIG. 3 is a block diagram illustrating an embodiment of a cloud server for supporting a client system tray application. In the example shown, cloud server 301 implements a cloud service platform and includes remote system tray management service 311, remote agent management service 313, notification service 315, and additional cloud services 317. Cloud server 301 is communicatively connected to a network such as the Internet via network connection 303. Cloud server 301 further utilizes data stores including UI metadata database 321 and cloud services databases 323. In some embodiments, cloud server 301 is cloud server 111 of FIG. 1, network connection 303 is connected to network 151 of FIG. 1, and UI metadata database 321 and/or cloud services databases 323 alone or together are database 121 of FIG. 1.

In some embodiments, cloud server 301 implements cloud services using service components such as remote system tray management service 311, remote agent management service 313, notification service 315, and additional cloud services 317. In various embodiments, remote system tray management service 311 provides a cloud service to manage a system tray application, such as system tray application 211 of FIG. 2, running on client devices such as client 101 of FIG. 1 and/or client 201 of FIG. 2. For example, remote system tray management service 311 is used to configure the user interface (UI) and corresponding functionality of one or more system tray applications running on one or more remote client devices. Moreover, the system tray application can be customized for a particular user and/or device such that different users of different devices can receive different customized versions of the system tray application including different customized UIs. In preparing a custom UI for a system tray application, remote agent management service 313 generates UI metadata specifying the customized UI and corresponding functionality. In various embodiments, the UI metadata can be stored in and retrieved from UI metadata database 321 and is provided via network connection 303 to the appropriate client(s) at the appropriate time. Moreover, one or more modular functional components required to implement the UI are provided to the client as well and can be referenced by the associated provided UI metadata. The provided functional components can implement UI views and/or associated functionality and can be stored in a UI data store such as UI metadata database 321.

In some embodiments, remote agent management service 313 provides a cloud service to manage an agent, such as agent 251 of FIG. 2, running on a client device such as client 101 of FIG. 1 and/or client 201 of FIG. 1. The associated agent can function like a system daemon and perform processing local to the client device. In various embodiments, the agent executes functional components that are configured via remote agent management service 313. For example, different configured functional components can collect different metrics of the client device such as processor performance, memory utilization, and network properties, among other metrics. In various embodiments, each client device can be configured with a different agent configuration, and each instance of the agent receives an executable configuration from remote agent management service 313. In some embodiments, the executable components and agent execute on a local client device are provided by a cloud service such as remote agent management service 313. For example, the executable configuration and/or the configured executable components can be stored in a data store such as a database of cloud services databases 323 and provided via network connection 303 to the agent running on the client device. In some embodiments, the agent management functionality of remote agent management service 313 is implemented as part of remote system tray management service 311. For example, as part of configuring a system tray application, a local agent can be configured as well, for example, to support the associated system tray application.

In some embodiments, notification service 315 provides a cloud service to manage notifications for remote clients running a system tray application. For example, client devices running a configured system tray application can receive real-time notifications from notification service 315 that are accessible from within a client's system tray application. The notifications can be customized to the user of the client device, the client device, and/or system tray application. For example, a notification can relate to a specific application executed by a user of the client device, such as a notification to the user that the application requires updating due to a detected security flaw. In some embodiments, the notification functionality of notification service 315 is implemented as part of remote system tray management service 311.

In some embodiments, additional cloud services 317 represent additional cloud services provided by cloud server 301, such as a configuration management database (CMDB) service as one example. In particular embodiments, additional cloud services 317 provide a variety of different cloud services and each can be running as a service component on cloud server 301. In the example shown, the variety of additional services offered are represented as additional cloud services 317.

In some embodiments, UI metadata database 321 and cloud services databases 323 function as data stores for storing and/or retrieving cloud services data. For example, UI metadata database 321 can be used by remote system tray management service 311 for UI metadata and related data for system tray application configurations. In some embodiments, UI metadata database 321 and/or cloud services databases 323 are used by remote agent management service 313 and/or notification service 315 for storing executable configurations and related data for agents running on client devices and/or notification service data and configuration settings for system tray applications. Cloud services databases 323 can be further used for storing cloud services data related to cloud services offered by additional cloud services 317.

Although shown as a single server, the cloud services of cloud server 301 can be implemented across one or more servers and can utilize a variety of different load balancing and/or load sharing techniques. The example of FIG. 3 is just one example of an implementation of a cloud server offering cloud services for managing a remote system tray application, a remote client device agent, and a notification service. For example, in some embodiments, the different services can be each implemented by a different cloud server and/or with a different variation of services supported by groups of different cloud servers.

Figure 4:
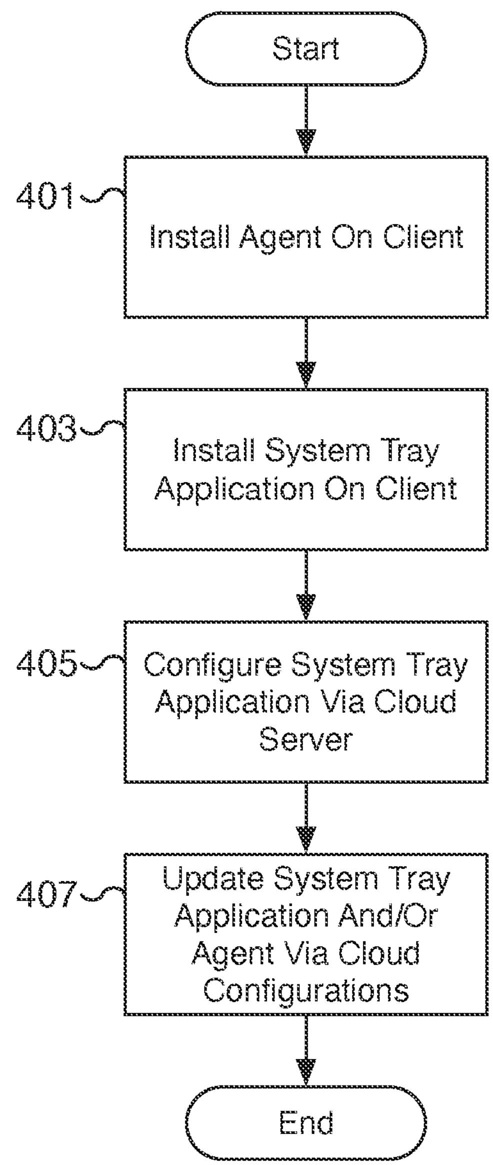
FIG. 4 is a flow chart illustrating an embodiment of a process for implementing a configurable system tray application.

FIG. 4 is a flow chart illustrating an embodiment of a process for implementing a configurable system tray application. For example, using the process of FIG. 4, a configurable operating system tray application is deployed to a client device and managed via a cloud service. The system tray application can communicate with an agent also installed on the client device to retrieve results from local processing performed by the agent. By using the system tray application, the user of the client device can access both cloud services and results from the agent from within the system tray application. In various embodiments, both the system tray application and the agent are configurable via a cloud service. In some embodiments, the client device is client 101 of FIG. 1 and/or client 201 of FIG. 2, the installed system tray application is system tray application 211 of FIG. 2, the installed agent is agent 251 of FIG. 2, and/or the cloud service is offered by cloud server 111 of FIG. 1 and/or cloud server 301 of FIG. 3.

At 401, an agent is installed on the client device. For example, an agent program is provided by a cloud service and installed on the client device. The agent can be granted access permissions that allow the agent to execute executable components on the client device to perform local functionality including monitoring functionality. For example, in some embodiments, the agent is configured to collect metrics of the client device such as metrics related to installed applications and their properties, current running processes and their properties, processor performance, memory performance, storage performance, and/or network performance, among other metrics. In various embodiments, the agent can communicate directly with a cloud service, for example, to provide processing results and/or to receive updated configuration data and/or commands.

At 403, a system tray application is installed on the client device. For example, an operating system tray application is provided by a cloud service and installed on the client device. The system tray application can be granted access permissions corresponding to a user of the client device that allows the user to access the functionality provided by the system tray application. In various embodiments, the system tray application will be configured for the user and, once configured, provides functionality that is specialized based on the user. For example, the user can access the system tray application to receive cloud data from a cloud server and/or data including metrics from the agent installed at 401. In various embodiments, the installed system tray application is configured at 405 using UI metadata that describes the UI of the system tray application and corresponding functionality.

At 405, the system tray application is configured via a cloud server. For example, one or more administrators configure the system tray application via a cloud service and the cloud service provides UI metadata describing the configuration to the installed system tray application. The provided UI metadata describes the customized UI of the system tray application and corresponding functionality. For example, the metadata can describe the type and instances of UI views to utilize for different corresponding functionality. In some embodiments, the UI metadata describes the different sections and/or tabs of the user interface and their corresponding contents and behavior. To implement the configured UI, the system tray application can utilize UI components including modular UI components provided by a cloud server. The provided UI components can include portions for implementing the UI view as well as corresponding functionality. For example, a UI component can implement a chatbot UI as well as the chatbot functionality.

In some embodiments, the installed agent is also configured as part of step 405. For example, an executable configuration is provided to the installed agent that allows the agent to perform local processing on the client device. The agent can be configured to collect metrics of the client device and provide the collected metrics to the installed system tray application. In various embodiments, the executable configuration is customized for a user of the client device and/or the system tray application.

In some embodiments, the step of 405 is performed in parallel and/or before the steps 401 and/or 403. For example, the system tray application can be first configured by administrators before the agent and/or system tray application are installed on the client device. Once the agent and system tray application are installed, they are provided with configurations from the cloud service based on the configuration provided by the administrators. In some embodiments, the steps of 401 and 403 are performed in parallel or are reversed.

At 407, the system tray application and/or the agent is updated via cloud configurations. For example, an administrator updates the functionality of the system tray application (and corresponding agent, if appropriate) via a cloud service. The agent installed at 401 and/or the system tray application installed at 403 is updated using cloud configurations provided by the cloud service. For example, UI metadata is provided to update the installed system tray application and/or an executable configuration is provided to the installed agent. In some embodiments, additional components are provided to the system tray application and/or agent to implement the updated configurations.

Figure 5:
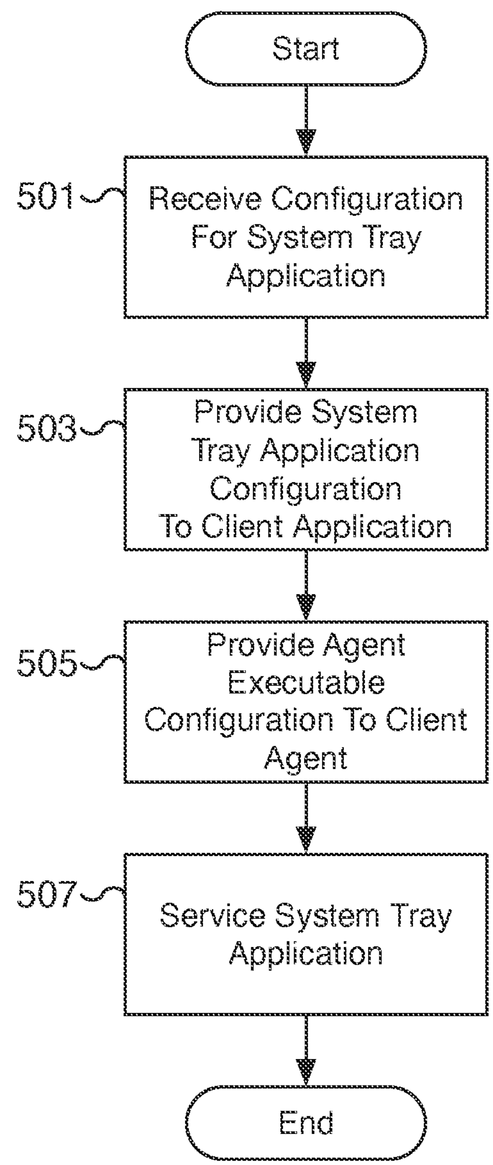
FIG. 5 is a flow chart illustrating an embodiment of a process for supporting a configurable system tray application via a cloud service.

FIG. 5 is a flow chart illustrating an embodiment of a process for supporting a configurable system tray application via a cloud service. For example, using the process of FIG. 5, a configurable operating system tray application and an accompanied agent are customized for a user and are supported via a cloud service. In some embodiments, a system tray application installed on a client device receives a cloud-based configuration, can access cloud service data and functionality, and/or can receive cloud-based notifications. In some embodiments, the process of FIG. 5 is performed at 405 and/or 407 of FIG. 4. In some embodiments, the client device running the system tray application is client 101 of FIG. 1 and/or client 201 of FIG. 2, the installed system tray application is system tray application 211 of FIG. 2, the corresponding installed agent is agent 251 of FIG. 2, and/or the cloud service steps of FIG. 5 are offered by cloud server 111 of FIG. 1 and/or cloud server 301 of FIG. 3.

At 501, a configuration for a system tray application is received. For example, one or more administrators can configure the UI and functionality of a system tray application for a user and/or client device via a cloud service. The configuration can be customized for the user based on the user's profile including the groups to which the user is a member. In various embodiments, the configuration data is stored as metadata that describes the received configuration. In some embodiments the configuration includes configuration data for a system tray application as well as configuration data for an accompanied agent utilized by the system tray application.

At 503, the system tray application configuration is provided to the client system tray application. For example, configuration metadata based on the configuration provided at 501 is provided to a system tray application installed on a client device. The provided metadata can be UI metadata that describes the customized UI and functionality of a system tray application for a particular user of the device. In various embodiments, the UI metadata can be provided with UI components for implementing the UI and corresponding functionality.

At 505, the agent executable configuration is provided to the client agent. For example, an executable configuration based on the configuration provided at 501 is provided to an agent installed on a client device. The provided executable configuration can include functional components for the agent to execute on the client device. Example functional components include components for collecting client device metrics.

At 507, the system tray application is serviced. For example, requests to the cloud service from the system tray application are serviced by the cloud service including requests initiated by the user interacting with the system tray application. In some embodiments, functionality of the cloud service is accessible from within the system tray application and the cloud service provides cloud service data in response to requests initiated by the user and/or system tray application. For example, in particular embodiments, configuration management database (CMDB) entries can be viewed and/or modified by a user from within a system tray application and the cloud service provides and updates the relevant CMDB data stored by the CMDB cloud service.

In some embodiments, the cloud service provides a notification service to the system tray application. For example, the cloud service can monitor properties of the running and/or installed applications on the client device and provide relevant application alerts to the user of the client device via the system tray application. In the event an application requires an update, the user can be notified of the update via the notification service. As another example, in the event other users of different devices are experiencing degraded performance for a particular application, the user can be notified via a warning alert notification accessible from the system tray application to inform the user of potential performance issues.

In some embodiments, the agent of the client device is also serviced by the cloud service as part of supporting the system tray application. For example, the agent can collect device metrics and provide those metrics for storage on the cloud service in addition to providing the metrics directly to the user via the system tray application. Moreover, in some embodiments, the agent can function to perform additional tasks that are outside the scope of the system tray application, for example, to implement additional cloud services.

Figure 6:
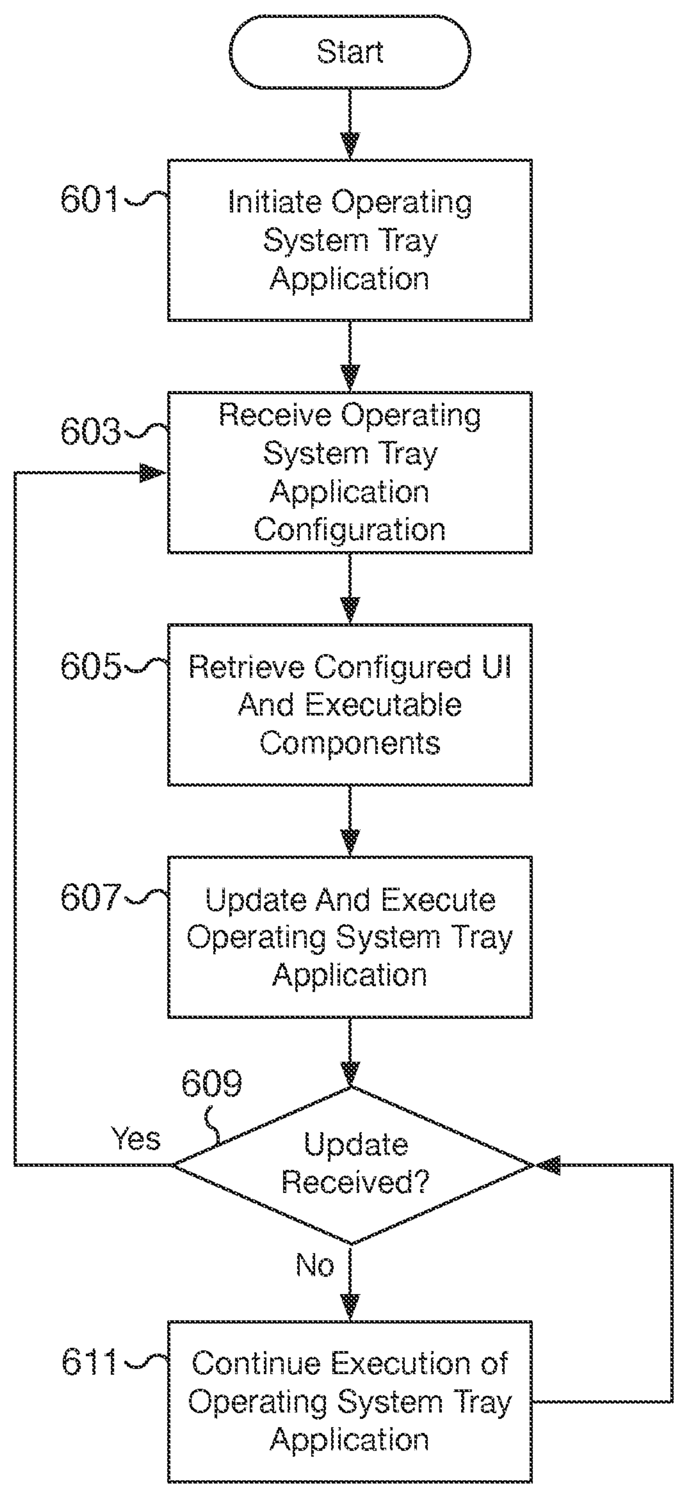
FIG. 6 is a flow chart illustrating an embodiment of a process performed by a configurable system tray application.

FIG. 6 is a flow chart illustrating an embodiment of a process performed by a configurable system tray application. For example, using the process of FIG. 6, a configurable operating system tray application is kept up to date and provides customized cloud service and local agent functionality to a user of a client device. In various embodiments, the system tray application installed on a client device receives cloud-based configurations that allow the user of the system tray application to access cloud service data and functionality as well as results computed by a local agent executing on the client device. In some embodiments, the process of FIG. 6 is performed at 407 of FIG. 4 and/or at 503, 505, and/or 507 of FIG. 5. In some embodiments, the client device running the system tray application is client 101 of FIG. 1 and/or client 201 of FIG. 2, the installed system tray application is system tray application 211 of FIG. 2, the corresponding installed agent is agent 251 of FIG. 2, and/or the related cloud services are offered by cloud server 111 of FIG. 1 and/or cloud server 301 of FIG. 3.

At 601, an operating system tray application is initiated. For example, an operating system tray application is launched and begins executing on the client device. In some embodiments, the system tray application is launched as part of the start-up process of a client device. The system tray application can be given the same access permissions as the user of the client device and/or be granted permissions with certain operating system access privileges. As part of the initialization step, the system tray application can establish remote and/or local connections, such as connections with cloud services and/or the local agent. For example, a connection can be established with a cloud service in anticipation of receiving configuration data.

At 603, an operating system tray application configuration is received. For example, UI metadata is received from a cloud service to configure the system tray application. The configuration information allows the system tray application to be customized for the user. In various embodiments, the UI metadata can include and/or reference functional components including UI components to rely on for implementing the UI. In some embodiments, configuration data is also received for a local agent executing on the client device. For example, an executable configuration can be received for the local agent to configure the functional capabilities of the local agent. In some embodiments, at least a portion of the configuration data is stored locally and retrieved from the local client device.

At 605, configured user interface (UI) and executable components are retrieved. For example, UI and/or executable components indicated by the configuration received at 603 are retrieved. For example, UI and/or executable components can be downloaded from a cloud service. By retrieving the new components and their functionality as modular components, the functionality of the system tray application can be updated as required by adding new (or removing old) functionality. For example, a chatbot component can be retrieved and loaded by the system tray application to implement a new chatbot functionality described by the configuration received at 603. As another example, one or more timesheet UI and corresponding functionality components can be retrieved and loaded by the system tray application to implement a new functionality for viewing and updating the user's timesheet. In various embodiments, the retrieved components correspond to the configuration received at 603.

At 607, the operating system tray application is updated and executed. For example, once the configuration and required functionality indicated by the configuration data is retrieved, the operating system tray application is updated to support the indicated configuration. The operating system tray application executes as a process on the client device and is enabled to provide the user with a customized UI based on the configuration received at 603. To implement the customized UI, the system tray application may dynamically load executable components retrieved at 605. In various embodiments, the operating system tray application minimizes and/or is made accessible from an operating system tray or similar UI application access location. This allows the user to readily and easily access the system tray application and its functionality regardless of the current applications running or in focus.

At 609, a determination is made whether an update has been received. In the event an update has been received, processing loops back to 603 to process the update. In the event an update has not been received, processing continues to 611 where the system tray application continues to operate using its current configuration.

At 611, execution of the operating system tray application continues. For example, the system tray application continues to execute on the client device and offers the same configured functionality via a customized UI to the user. The system tray application continues to operate in this manner, continuously looping back to 609 to check whether a new update has been received.

Figure 7:
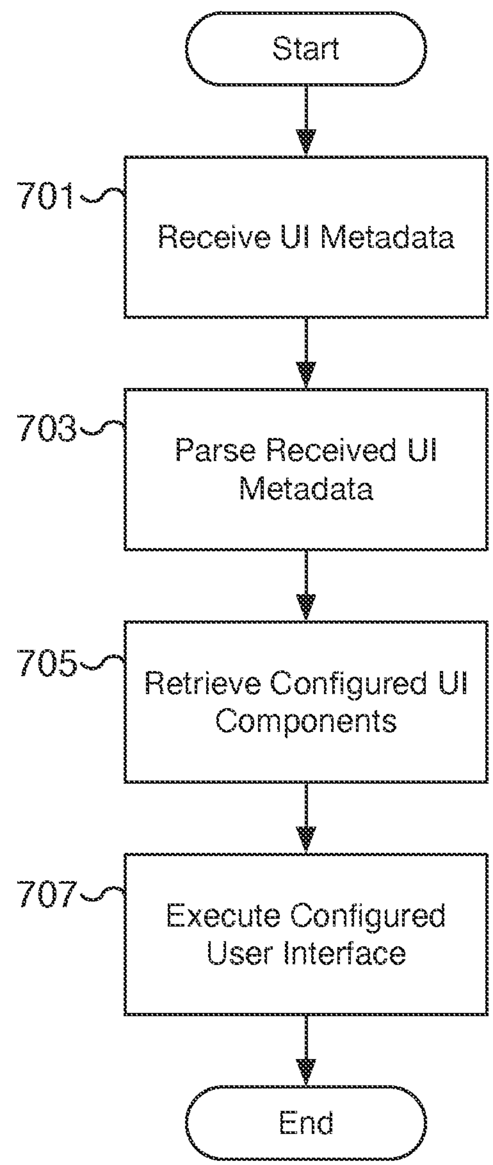
FIG. 7 is a flow chart illustrating an embodiment of a process performed by a configurable system tray application to create a customized user interface.

FIG. 7 is a flow chart illustrating an embodiment of a process performed by a configurable system tray application to create a customized user interface. For example, using the process of FIG. 7, a configurable operating system tray application provides to a user a customized UI to access cloud services and local agent functionality. In various embodiments, the system tray application installed on a client device receives UI metadata from a cloud service. The UI metadata describes the UI configuration and corresponding UI components are retrieved to implement the described configuration. In some embodiments, the process of FIG. 7 is performed at 407 of FIG. 4, at 503 and/or 505 of FIG. 5, and/or at 603, 605, and/or 607 of FIG. 6. In some embodiments, the client device running the system tray application is client 101 of FIG. 1 and/or client 201 of FIG. 2, the installed system tray application is system tray application 211 of FIG. 2, the corresponding installed agent is agent 251 of FIG. 2, and/or the related cloud services are offered by cloud server 111 of FIG. 1 and/or cloud server 301 of FIG. 3.

At 701, UI metadata is received. For example, UI metadata is received from a cloud service and indicates the customized UI and corresponding functionality of the system tray application. In some embodiments, the UI metadata is automatically generated based on configuration settings provided by one or more administrators to a cloud service such as remote system tray management service 311 of FIG. 3. The UI metadata can describe the different UI views to utilize for implementing the UI of the system tray application as well as executable components for implementing functionality related to the UI views. In some embodiments, the UI metadata describes the different sections and/or tabs of the UI and their corresponding contents and behavior.

At 703, the received UI metadata is parsed. For example, the UI metadata received at 701 is parsed by a UI metadata engine such as UI metadata engine 225 of FIG. 2. Once parsed, the different component functions of the UI can be determined as well as the dependencies and requirements for implementing the described UI. For example, the UI metadata can reference the UI components required for implementing a particular UI view, the order and/or arrangement of different UI views relative to one another, and the behavior of the described UI views, among other properties of the UI.

At 705, configured UI components are retrieved. For example, one or more UI components including executable and/or functional components are retrieved to implement the UI indicated by the UI metadata received at 701. In some embodiments, the UI components are modular and can be stored locally and/or retrieved from a remote source such as a cloud service. Examples of UI components can include UI components for implementing UI views for a chatbot, an interactive form, a list, a document, a spreadsheet, a video, an image, an audio file, a popup window, or a tabbed window, among others. In some embodiments, the retrieved UI components correspond to UI components 223 of FIG. 2 and/or downloaded modular components 231 of FIG. 2.

At 707, the configured user interface is executed. For example, once the required UI components are retrieved, the UI of the system tray application can be built and executed. In some embodiments, the construction of the UI is performed by a UI layer of the system tray application such as UI layer 221 of FIG. 2. In various embodiments, the execution step of 707 includes instantiating the specified and required UI views of the UI metadata for the system tray application and can require retrieving the specified cloud service data and/or local agent data required to populate the associated UI components. In various embodiments, the execution step includes a rendering step that presents the customized UI of the system tray application to the user as a customized graphical user interface.

Figure 8:
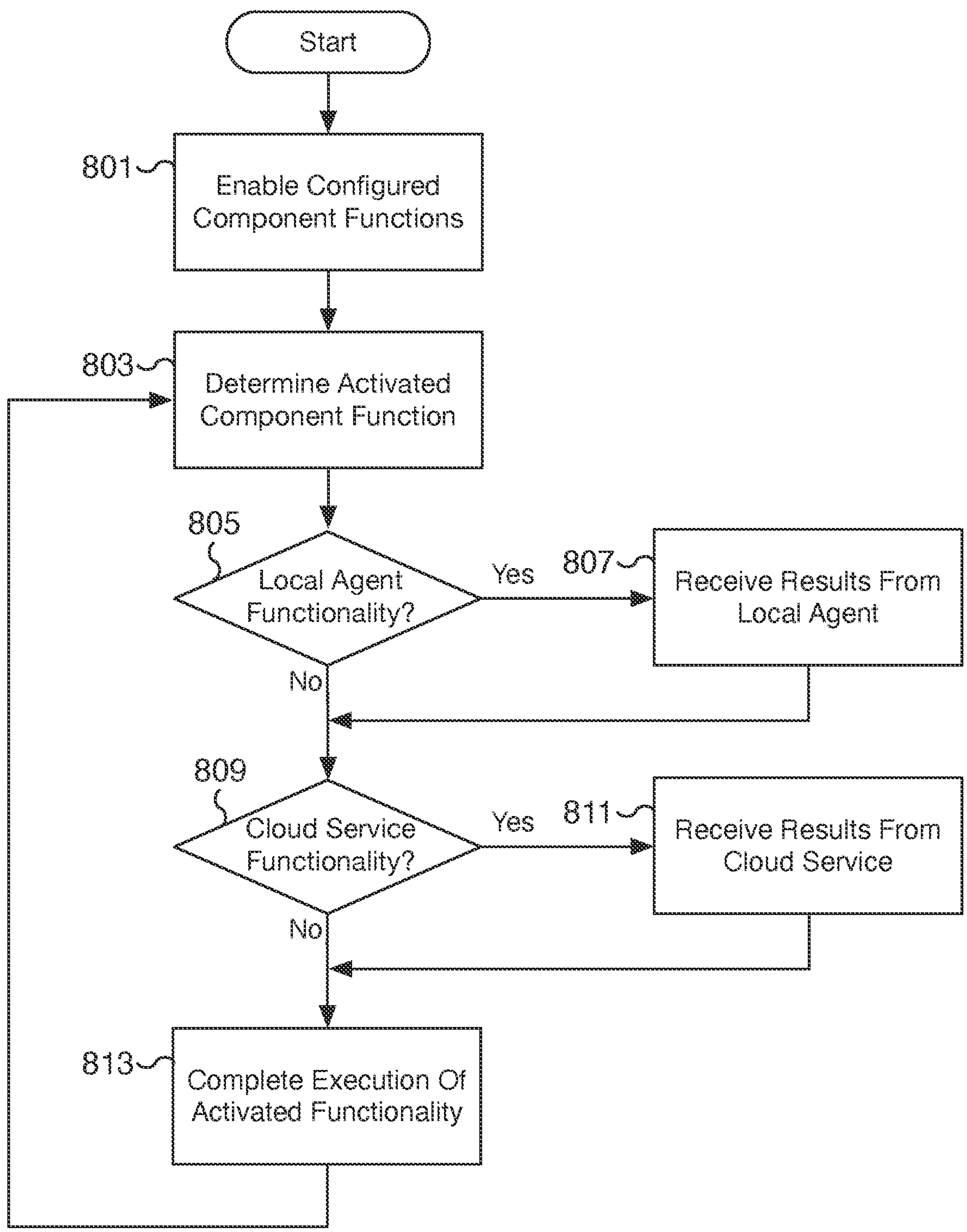
FIG. 8 is a flow chart illustrating an embodiment of a process performed by a configurable system tray application.

FIG. 8 is a flow chart illustrating an embodiment of a process performed by a configurable system tray application. For example, using the process of FIG. 8, a user can access cloud service data and local agent data from a configurable operating system tray application. In various embodiments, the system tray application is installed on a client device and establishes one or more network (remote and/or local) connections with both a cloud service as well as an agent executing on the local client device. In some embodiments, the process of FIG. 8 is performed at 507 of FIG. 5, at 607 and/or 611 of FIG. 6, and/or at 707 of FIG. 7. In some embodiments, the client device running the system tray application is client 101 of FIG. 1 and/or client 201 of FIG. 2, the installed system tray application is system tray application 211 of FIG. 2, the corresponding installed agent is agent 251 of FIG. 2, and/or the related cloud services are offered by cloud server 111 of FIG. 1 and/or cloud server 301 of FIG. 3.

At 801, configured component functions are enabled. For example, the component functions enabled for the system tray application are enabled and made accessible to the user. In some embodiments, the configuration is specified by a UI metadata provided by a cloud service. Using the provided configuration, the system tray application enables one or more component functions. The component functions can provide access to cloud services and/or local agent results. For example, two or more component functions can be presented to the user as different UI views. The different UI views can be selected by navigating to different sections, tabs, etc. of the system tray application. Each of the corresponding UI views can be selected by the user allowing the user to interact with the selected UI view and its provided functionality.

At 803, the activated component function is determined. For example, a user selects one of the enabled component functions of the system tray application. By selecting a component function, the user activates the functionality associated with its UI component. In some embodiments, the functionality is related to a cloud service, such as accessing CMDB entries stored in a CMDB cloud service. As another cloud service example, the functionality can include allowing the user to review the status of an IT ticket submitted to an IT management cloud service. Similarly, the functionality can relate to functionality provided by an agent executing on the local client device. For example, local agent functionality can provide client device metrics such as processing, memory, network, and/or storage performance, among other client device data. The activated component function can provide the collected metrics to the user via an active UI component of the system tray application.

At 805, a determination is made whether the activated function relates to functionality of the local agent. In the event the activated function relates to functionality of the local agent, processing proceeds to 807 where the local agent is accessed. In the event the activated function does not relate to functionality of the local agent, processing proceeds to 809.

At 807, results are received from the local agent executing on the client device. For example, metrics or other requested agent data is provided from the agent to the system tray application. The provided results are utilized by the system tray application and can be presented to the user via the customized graphical UI. For example, results from a network speed test performed by the local agent can be presented to the user in a UI view of the system tray application configured for presenting network speed results. Other metrics an agent can provide include metrics related to processor activity, processor performance, memory usage, storage usage, activity time, process properties, temperature, graphics processor performance, or network activity, among others.

At 809, a determination is made whether the activated function relates to a cloud service functionality. In the event the activated function relates to a cloud service functionality, processing proceeds to 811 where cloud services are accessed. In the event the activated function does not relate to a cloud service functionality, processing proceeds to 813.

At 811, results are received from a cloud service. For example, cloud service data is provided by a cloud service to fulfill a request by the activated component function of the system tray application. The provided cloud service results data can be data stored, managed, and/or computed by the cloud service such as data related to CMDB entries, information technology tickets, human resource policy documents, shared team documents, etc. The provided cloud service data is utilized by the system tray application and can be presented to the user via the customized graphical UI. For example, a human resource form can be provided by the cloud service for the user to complete via the system tray application.

At 813, the execution of the activated functionality is completed. For example, the results received from the local agent and/or the cloud service are utilized by the activated component. In some embodiments, the activated component may perform additional processing on the results before presenting them to the user in a customized graphical user interface. For example, client device metrics, such as the results from a network speed test, can be processed and formatted to present the data in a stylized manner with a customized and rich graphical user interface that is easy for the user to digest. Similarly, cloud service data that includes database entries can be processed and formatted before presenting the data to the user in a customized and rich graphical user interface. In various embodiments, once the activated component completes its execution, processing loops back to 803 to process additional user input events, such as selecting the next component function to activate.

Figure 9:
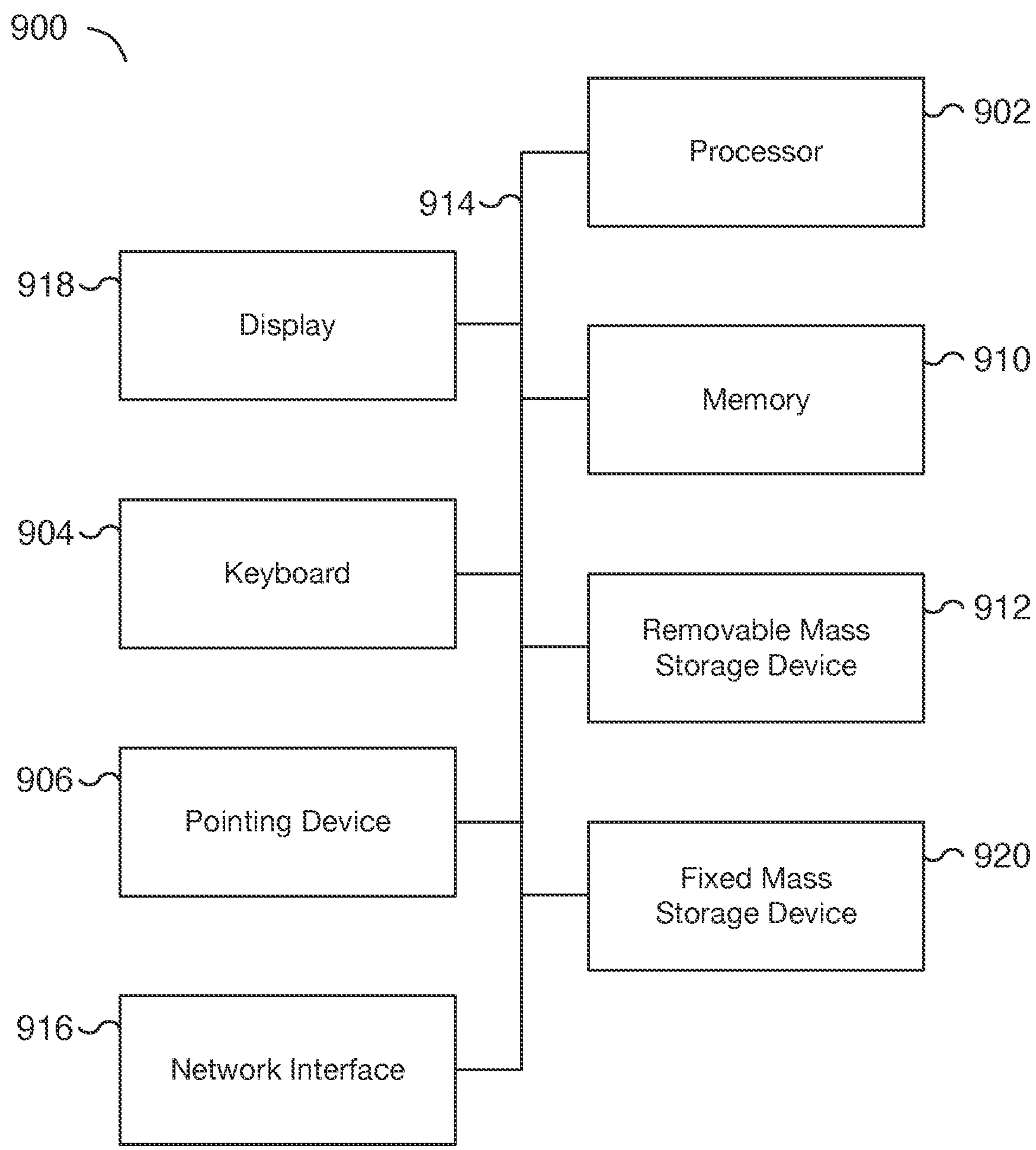
FIG. 9 is a functional diagram illustrating a programmed computer system for implementing a configurable system tray application in accordance with some embodiments.

FIG. 9 is a functional diagram illustrating a programmed computer system for implementing a platform for a configurable system tray application in accordance with some embodiments. As will be apparent, other computer system architectures and configurations can be utilized for order-preserving obfuscation of a protected dataset and/or performing comparison queries on the obfuscated data. Examples of computer system 900 include client 101 of FIG. 1, one or more computers of cloud server 111 of FIG. 1, one or more computers of database 121 of FIG. 1, client 201 of FIG. 2, cloud server 301 of FIG. 3, one or more computers of UI metadata database 321 of FIG. 3, and/or one or more computers of cloud services databases 323 of FIG. 3. Computer system 900, which includes various subsystems as described below, includes at least one microprocessor subsystem (also referred to as a processor or a central processing unit (CPU)) 902. For example, processor 902 can be implemented by a single-chip processor or by multiple processors. In some embodiments, processor 902 is a general purpose digital processor that controls the operation of the computer system 900. Using instructions retrieved from memory 910, the processor 902 controls the reception and manipulation of input data, and the output and display of data on output devices (e.g., display 918). In various embodiments, one or more instances of computer system 900 can be used to implement at least portions of the processes of FIGS. 4-8.

Processor 902 is coupled bi-directionally with memory 910, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 902. Also as is well known in the art, primary storage typically includes basic operating instructions, program code, data and objects used by the processor 902 to perform its functions (e.g., programmed instructions). For example, memory 910 can include any suitable computer-readable storage media, described below, depending on whether, for example, data access needs to be bi-directional or unidirectional. For example, processor 902 can also directly and very rapidly retrieve and store frequently needed data in a cache memory (not shown).

A removable mass storage device 912 provides additional data storage capacity for the computer system 900, and is coupled either bi-directionally (read/write) or unidirectionally (read only) to processor 902. For example, storage 912 can also include computer-readable media such as magnetic tape, flash memory, PC-CARDS, portable mass storage devices, holographic storage devices, and other storage devices. A fixed mass storage 920 can also, for example, provide additional data storage capacity. The most common example of mass storage 920 is a hard disk drive. Mass storages 912, 920 generally store additional programming instructions, data, and the like that typically are not in active use by the processor 902. It will be appreciated that the information retained within mass storages 912 and 920 can be incorporated, if needed, in standard fashion as part of memory 910 (e.g., RAM) as virtual memory.

In addition to providing processor 902 access to storage subsystems, bus 914 can also be used to provide access to other subsystems and devices. As shown, these can include a display monitor 918, a network interface 916, a keyboard 904, and a pointing device 906, as well as an auxiliary input/output device interface, a sound card, speakers, and other subsystems as needed. For example, the pointing device 906 can be a mouse, stylus, track ball, or tablet, and is useful for interacting with a graphical user interface.

The network interface 916 allows processor 902 to be coupled to another computer, computer network, or telecommunications network using a network connection as shown. For example, through the network interface 916, the processor 902 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 902 can be used to connect the computer system 900 to an external network and transfer data according to standard protocols. For example, various process embodiments disclosed herein can be executed on processor 902, or can be performed across a network such as the Internet, intranet networks, or local area networks, in conjunction with a remote processor that shares a portion of the processing. Additional mass storage devices (not shown) can also be connected to processor 902 through network interface 916.

An auxiliary I/O device interface (not shown) can be used in conjunction with computer system 900. The auxiliary I/O device interface can include general and customized interfaces that allow the processor 902 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 9 is but an example of a computer system suitable for use with the various embodiments disclosed herein. Other computer systems suitable for such use can include additional or fewer subsystems. In addition, bus 914 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:

providing an executable configuration to an agent executing on a client device, wherein the agent is configured to execute the executable configuration to collect application performance metrics of one or more applications executing on the client device;

causing an operating system tray application to automatically launch when the client device boots and remain executing in a background of the client device; and providing user interface metadata for the operating system tray application, wherein the user interface metadata indicates a plurality of different component functions, including:

a first component function to obtain, from the agent, one or more of the application performance metrics, and to provide access to the one or more of the application performance metrics by way of the operating system tray application, and a second component function to obtain service data from a cloud service, and to provide, based on the application performance metrics obtained from the agent, a notification relating to operation of the one or more applications on other devices by way of the operating system tray application.

2. The method of claim 1, wherein the user interface metadata is customized for a user of the client device.

3. The method of claim 1, wherein the executable configuration is provided by the cloud service.

4. The method of claim 1, wherein the user interface metadata is provided by the cloud service.

5. The method of claim 1, wherein the service data comprises a real-time notification initiated by the cloud service.

6. The method of claim 5, wherein the real-time notification is associated with the one or more applications.

7. The method of claim 1, wherein the application performance metrics include one or more of the following: processor activity, processor performance, memory usage, storage usage, activity time, process properties, temperature, graphics processor performance, or network activity.

8. The method of claim 7, wherein the process properties include a list of current running processes or the memory usage of one or more processes.

9. The method of claim 1, wherein at least some of the application performance metrics obtained from the agent are cached by the operating system tray application.

10. The method of claim 1, wherein the operating system tray application is configured to execute in a first process space and the agent executing on the client device is configured to execute in a second process space.

11. The method of claim 1, wherein a first set of access permissions granted to the operating system tray application is different from a second set of the access permissions granted to the agent executing on the client device.

12. The method of claim 1, wherein the user interface metadata specifies one or more user interface views.

13. The method of claim 12, wherein each of the one or more user interface views is associated with one or more of the following: a configuration for a chatbot, an interactive form, a list, a document, a spreadsheet, a video, an image, an audio file, a popup window, or a tabbed window.

14. A system comprising:

one or more processors; and a memory coupled to the one or more processors, wherein the memory is configured to provide the one or more processors with instructions which when executed cause the one or more processors to:

provide an executable configuration to an agent executing on a client device, wherein the agent is configured to execute the executable configuration to collect application performance metrics of one or more applications executing on the client device;

cause an operating system tray application to automatically launch when the client device boots and remain executing in a background of the client device; and provide user interface metadata for the operating system tray application executing on the client device, wherein the user interface metadata indicates a plurality of different component functions, including:

a first component function to obtain, from the agent, one or more of the application performance metrics, and to provide access to the one or more of the application performance metrics by way of the operating system tray application, and a second component function to obtain service data from a cloud service, and to provide, based on the application performance metrics obtained from the agent, a notification relating to operation of the one or more applications on other devices by way of the operating system tray application.

15. The system of claim 14, wherein the service data comprises a real-time notification initiated by the cloud service.

16. The system of claim 14, wherein the application performance metrics include one or more of the following: processor activity, processor performance, memory usage, storage usage, activity time, process properties, temperature, graphics processor performance, or network activity.

17. The system of claim 14, wherein the operating system tray application is configured to execute in a first process space and the agent executing on the client device is configured to execute in a second process space.

18. The system of claim 14, wherein a first set of access permissions granted to the operating system tray application is different from a second set of the access permissions granted to the agent executing on the client device.

19. A computer program product, the computer program product being embodied in a non-transitory computer readable storage medium and comprising computer instructions for:

providing an executable configuration to an agent executing on a client device, wherein the agent is configured to execute the executable configuration to collect application performance metrics of one or more applications executing on the client device;

causing an operating system tray application to automatically launch when the client device boots and remain executing in a background of the client device; and providing user interface metadata for the operating system tray application executing on the client device, wherein the user interface metadata indicates a plurality of different component functions, including:

a first component function to obtain, from the agent, one or more of the application performance metrics, and to provide access to the one or more of the application performance metrics by way of the operating system tray application, and a second component function to obtain service data from a cloud service, and to provide, based on the application performance metrics obtained from the agent, a notification relating to operation of the one or more applications on other devices by way of the operating system tray application.

* * * * *